No. 874,819. PATENTED DEC. 24, 1907.
H. H. ALLISON.
RECORD NEEDLE.
APPLICATION FILED MAR. 18, 1907.

WITNESSES
Edward Thorpe
J. W. Hardie

INVENTOR
Harvey H. Allison
BY Munn & Co.
ATTORNEYS

UNITED STATES PATENT OFFICE.

HARVEY H. ALLISON, OF NEW YORK, N. Y.

RECORD-NEEDLE.

No. 874,819.

Specification of Letters Patent.

Patented Dec. 24, 1907.

Application filed March 18, 1907. Serial No. 362,937.

*To all whom it may concern:*

Be it known that I, HARVEY H. ALLISON, a citizen of the United States, and a resident of the city of New York, borough of Brooklyn, in the county of Kings and State of New York, have invented a new and Improved Record-Needle, of which the following is a full, clear, and exact description.

This invention relates to needles used in connection with talking machines, and has for its object to provide means capable of producing even, harmonious sounds, free from the chatter, vibrations and strident tones commonly produced by the devices now in use.

Figure 1:
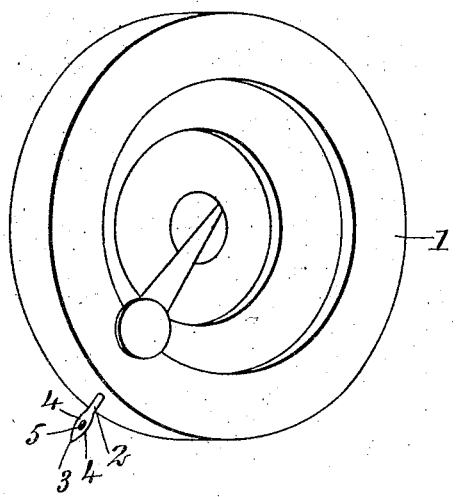
Figure 2:
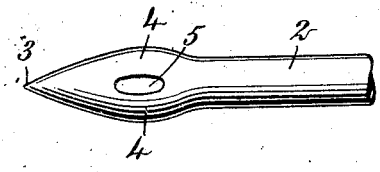
Figure 3:
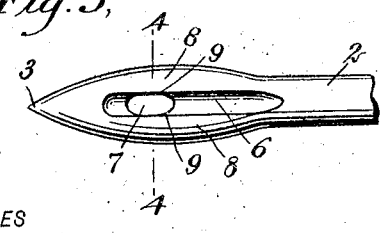
Figure 4:
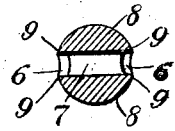

Such objects I accomplish by the means illustrated in the accompanying drawings, in which drawings like characters of reference indicate like parts throughout the views, and in which Figure 1 is a perspective view showing a device embodying my invention applied to the sounding box of a talking machine; Fig. 2 is a side elevation of the device shown in Fig. 1 detached from the sounding box; Fig. 3 is a side elevation of a device embodying a modified form of my device; and Fig. 4 is a cross section taken on the line 4—4 of Fig. 3.

As illustrated in the drawings, 1 represents a sounding box of a talking machine of ordinary construction, to which is attached a needle having a stub shank, adapted to extend between said sounding box and the record of a machine. The needle is provided with a head having a point 3 connected with the shank, by means of arms 4 spaced from each other so as to form a central aperture 5. The head of the needle is preferably made wider than the shank, and provided with longitudinal grooves 6 on opposite sides of the head having an aperture 7 formed in said grooves, thereby forming oppositely disposed arms 8, preferably segmental in cross section, as illustrated in Fig. 4, so as to form edges 9 on said arms adjacent to said grooves 6.

Having thus described my invention, what I claim as new and desire to secure by Letters Patent is:

1. In a talking machine, the combination of a sounding box, and a needle having a shank and a head broader than said shank, provided with a point, and with arms spaced apart connecting the point and the shank of the needle.

2. The combination of a sounding box, and a needle having a shank, and a head provided with a point, and with arms spaced apart connecting the point and the shank of the needle 3. The combination of a sounding box and a needle having a shank, and a head provided with a point, and with an aperture forming arms segmental in cross section connecting said point with the shank of the needle.

4. In a talking machine, the combination of a sounding box, and a needle having a shank, and a head provided with oppositely disposed longitudinal grooves, and an aperture extending through said grooves.

In testimony whereof I have signed my name to this specification in the presence of two subscribing witnesses.

HARVEY H. ALLISON.

Witnesses:
ROBERT W. HARDIE,
JOHN P. DAVIS.